United States Patent [19]

Smoot

[11] 4,361,731

[45] Nov. 30, 1982

[54] COIN TELEPHONE CONTROL CIRCUIT

[75] Inventor: Lanny S. Smoot, Morris Plains, N.J.

[73] Assignee: Bell Telephone Laboratories, Incorporated, Murray Hill, N.J.

[21] Appl. No.: 234,249

[22] Filed: Feb. 13, 1981

[51] Int. Cl.³ .................... H04M 17/02; H04M 19/00
[52] U.S. Cl. ................................. 179/6.3 R; 179/2.51
[58] Field of Search .................. 179/6.3 R, 6.5, 2.51; 370/71, 76

[56] References Cited

U.S. PATENT DOCUMENTS

| | | | |
|---|---|---|---|
| 4,010,328 | 3/1977 | McGuire | 179/6.3 R |
| 4,152,546 | 5/1979 | Stewart | 179/2.51 |
| 4,174,468 | 11/1979 | Stelte | 179/6.3 R |
| 4,197,432 | 4/1980 | Tiedt | 179/2.51 |
| 4,197,433 | 4/1980 | Bronner | 179/2.51 |
| 4,243,841 | 1/1981 | Young | 179/6.3 R |

Primary Examiner—Gerald L. Brigance
Attorney, Agent, or Firm—R. O. Nimtz

[57] ABSTRACT

Coins deposited in a coin telephone are collected or refunded by selectively discharging one of a plurality of capacitors (10,12) through a current limiter (46) for a period just long enough to operate the coin control relay (38) in the telephone. Use of this current limiter minimizes the drain of power from the remote terminal of a subscriber loop carrier system which derives all of its power from a telephone central office. A second current limiter (24) limits the rate at which the capacitors are charged.

9 Claims, 3 Drawing Figures

COIN TELEPHONE CONTROL CIRCUIT

BACKGROUND OF THE INVENTION

1. Field of the Invention

This invention relates to coin telephone control circuits and, in particular, to a coin control circuit for use with subscriber loop carrier systems.

2. Description of the Prior Art

Normally a ±130 volt pulse with a width of about 750 milliseconds is transmitted from a central office to operate a coin telephone relay for collecting or returning coins, respectively. This pulse cannot be transmitted over a subscriber loop carrier system. Consequently, Mr. J. W. Schrage, in his application, Ser. No. 234,250, filed concurrently herewith and assigned to the same assignee, has suggested a solution. A plurality of capacitors are charged in parallel from the telephone line or from a low power voltage source at the remote carrier terminal. As and when coins are to be collected or returned, one of the capacitors is discharged to provide the coin control pulse. Whereas this solution permits the generation of a coin collect or refund pulse, an uneconomical use of remote carrier terminal power results. In a subscriber loop carrier system powered entirely from the central office, it is desirable to conserve such remotely consumed power.

SUMMARY OF THE INVENTION

In accordance with the illustrative embodiment of the present invention, a capacitor is discharged for a timed interval through a current limiter for providing the minimum control current necessary for operating a coin control relay.

If the relay is not properly operated the first time, or if the relay is to be operated again, another capacitor from a plurality of charged parallel capacitors is discharged for the timed interval through a current limiter for providing the minimum control current.

A major advantage of the present invention is the efficient use of the limited power available at a remote carrier terminal when the terminal is powered entirely from the telephone central office.

Another advantage is the fixed discharge period of the capacitor regardless of variation in the period of a control signal transmitted from the telephone central office.

DETAILED DESCRIPTION

Figure 1:
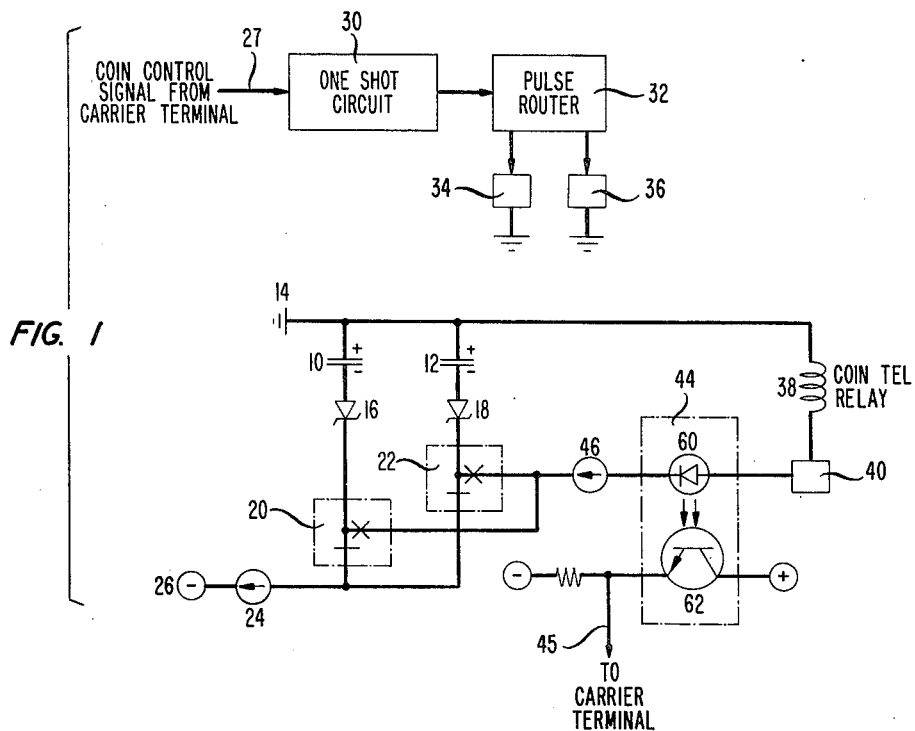
FIG. 1 shows a coin telephone control circuit at a remote carrier terminal for collecting or refunding coins.

Referring to FIG. 1, there is shown a coin control circuit for use at the remote terminal of a subscriber loop carrier system which derives all its power from the telephone central office (not shown). The power to operate the coin control circuit is supplied from a −200 volt supply 26. Such a voltage supply may be a central office powered ringing generator for supplying telephone ringing signals, as disclosed more fully in U.S. Pat. No. 4,239,935 granted Dec. 16, 1980 to Messrs. B. S. Bosik and F. P. Tuhy, Jr. The circuit of FIG. 1 may also be powered directly from a metallic loop extending to the central office. Coin control signals are transmitted from the telephone central office over the subscriber loop carrier system in a manner similar to that disclosed in U.S. Pat. No. 4,224,476 granted Sept. 23, 1980 to Mr. F. P. Tuhy, Jr.

Referring more particularly to FIG. 1, there is shown a plurality of capacitors 10,12 connected in parallel between a common point 14 and the aforesaid voltage supply 26 through zener diodes 16,18 and switches 20,22, respectively, and further, through current limiter 24. Current limiter 24 limits the capacitor charging current to about 10 milliamperes, thereby conserving the power available from voltage source 26.

Figure 2:
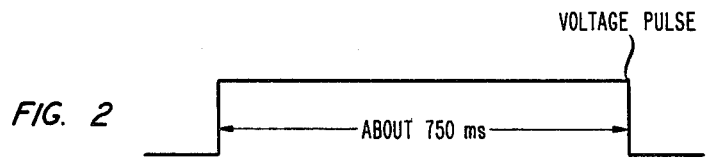
FIG. 2 shows a normal coin control voltage pulse.

A coin control signal received at the remote carrier terminal may be in the form of a frequency code as described in the above-mentioned Tuhy patent. The frequency code is converted to a voltage pulse, shown in FIG. 2, and transmitted over lead 27 to one shot circuit 30. One shot circuit 30 is a 250 millisecond timer for permitting the pulse router 32 to activate alternately either relay 34 or relay 36 for 250 milliseconds.

Relays 34 and 36 operate switches 20 and 22, respectively. When pulse router 32 activates relay 34, switch 20 will be operated, thereby disconnecting capacitor 10 from voltage source 26 and, instead, connecting coin telephone relay 38 across the capacitor 10. Capacitor 10 discharges and the discharge current flows through coin relay 38, lightning protector 40, detector 44, current limiter 46, and zener diode 16.

Because a current of about 41 milliamperes for a minimim period of 250 milliseconds is necessary to operate a typical coin telephone relay it is sufficient that capacitor 10 be discharged for this minimum period. Furthermore, current limiter 46 insures that a current of about 50 milliamperes flows through coin relay 38.

Figure 3:
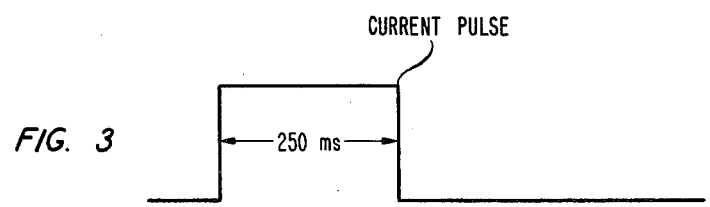
FIG. 3 shows a current pulse for the minimum period required in order to operate a standard coin telephone relay.

A suitable capacity for capacitor 10 can than be selected to provide the necessary current pulse for coin control. Such a current pulse is shown in FIG. 3. Thus, in accordance with the present invention, power is used efficiently at a remote carrier terminal by using a current pulse of the minimum amplitude and period to effect coin collection or refund at a coin telephone.

Referring again to FIG. 1, there is shown a coin telephone relay 38 connected to a protection device 40 for protection against spurious signals, for example, lightning. Zener diodes 16 and 18 prevent capacitors 10 and 12 from discharging below a threshold voltage.

Detector 44 is a optoisolator for detecting current flow through the coin telephone relay 38 during the application of the 250 millisecond coin control signal. Thus current flowing through light emitting diode (LED) 60 turns on the transistor 62. LED 60 may be protected by connecting in parallel across it a resistor (not shown). Transistor 62 is connected via lead 45 to remote carrier terminal equipment (not shown). The condition that current flows through detector 44 indicates that coins are present in the telephone and is conveyed from the remote carrier terminal to the telephone central office. Likewise, when no coins are present in the telephone, no current will flow through the detector 44.

After the 250 millisecond coin control period has elapsed, talking battery at the remote carrier terminal (not shown) is connected between the tip conductor and ground. Thus a current of about 21 milliamperes will flow through the coin telephone relay 38, and is returned via a ground path to auxiliary equipment (not shown) at the remote carrier terminal. If coins are not collected or refunded, current will continue to flow through the relay 38 and will be detected at the remote carrier terminal. If coins are collected or refunded, a contact (not shown) at the coin telephone will be opened, as is well-known in the art. This condition will be detected, likewise, at the remote carrier terminal by the cessation of current. These aforesaid conditions are in turn transmitted from the remote carrier terminal to the central office where it is determined whether coins have been collected, refunded, or not.

If a first coin control signal does not effect the anticipated collection or refund of coins, another control signal is transmitted from the central office. As stated earlier, pulse router 32 responds to the telephone office control signal and alternately activates either relay 34 or relay 36. If relay 36 is activated, switch 22 is operated, causing capacitor 12 to discharge a 50 milliampere current pulse for 250 milliseconds through the coin telephone relay 38 as described in detail hereinbefore. Whereas the scheme shown in FIG. 1 provides a −50 milliampere pulse with respect to ground to effect coin refund, it is a simple matter to provide a +50 milliampere pulse to effect coin collect, by using either a second plurality of capacitors and similar control circuitry or by using a relay to reverse the polarity of the pulse generated by the scheme shown in FIG. 1.

That which is claimed is:

1. A coin telephone control circuit CHARACTERIZED BY
    means for providing a constant current pulse to effect collection or refund of coins in said coin telephone (38), said means including
    a plurality of capacitors (10, 12) connected in parallel for storing energy.

2. The coin telephone control circuit according to claim 1 further CHARACTERIZED BY
    means (34,36,20,22) for selectively discharging said capacitors one at a time.

3. The coin telephone control circuit according to claim 2 further CHARACTERIZED BY
    means (30) for limiting the discharge of said capacitors for a selected period.

4. The coin telephone control circuit according to claim 2 further CHARACTERIZED BY
    means (16,18) for limiting the discharge of said capacitors below a threshold voltage.

5. The coin telephone control circuit according to claim 1 further CHARACTERIZED BY
    means (24) for limiting the rate at which said capacitors are charged.

6. The coin telephone control circuit according to claim 1 further CHARACTERIZED BY
    means (46) for limiting the rate at which said capacitors are discharged to produce said current pulse.

7. The coin telephone control circuit according to claim 1 further CHARACTERIZED BY
    means for detecting whether said coins were collected in response to said current pulse.

8. The coin telephone control circuit according to claim 7 further CHARACTERIZED BY
    means (32) for providing said current pulse repeatedly until said coins are collected.

9. A coin telephone control circuit for collecting or refunding coins, said circuit comprising
    a plurality of capacitors (10,12),
    means (30,32,34,36,20,22) for selectively discharging said capacitors one at a time through said coin telephone,
    means (46) for limiting the flow of discharge current through said coin telephone,
    means (24) for limiting the current for charging said capacitors, and
    means (16,18) for preventing the discharge of said capacitors below a threshold value.

* * * * *